United States Patent
McCartney et al.

(10) Patent No.: US 6,725,788 B2
(45) Date of Patent: Apr. 27, 2004

(54) PNEUMATIC COUPLER FOR AN AGRICULTURAL SEEDING MACHINE

(75) Inventors: Scott Charles McCartney, Davenport, IA (US); Robert Wallace Martin, Parkview, IA (US); Nathan Albert Mariman, Geneseo, IL (US); Donald Keith Landphair, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/106,622

(22) Filed: Mar. 26, 2002

(65) Prior Publication Data

US 2003/0183142 A1 Oct. 2, 2003

(51) Int. Cl.$^7$ .................................... A01C 7/00
(52) U.S. Cl. ................. 111/175; 111/200; 285/901
(58) Field of Search ................. 111/174, 175, 111/170, 200, 77; 406/184, 188, 189, 190, 191, 125, 145; 221/211; 285/140.1, 210, 901; 222/563

(56) References Cited

U.S. PATENT DOCUMENTS

| | | | | |
|---|---|---|---|---|
| 832,287 | A | * 10/1906 | Beach | 285/210 |
| 1,753,631 | A | * 4/1930 | Walters | 220/787 |
| 2,962,688 | A | * 11/1960 | Werner | 439/320 |
| 3,129,993 | A | * 4/1964 | Ross | 439/294 |
| 3,490,654 | A | * 1/1970 | Fischer | 406/123 |
| 3,514,129 | A | * 5/1970 | Holdren | 285/140.1 |
| 3,568,977 | A | * 3/1971 | Nelson | 251/148 |
| 3,716,257 | A | * 2/1973 | Hackman et al. | 285/210 |
| 3,741,217 | A | * 6/1973 | Ciarico | 604/256 |
| 4,133,347 | A | * 1/1979 | Mercer | 137/240 |
| 4,232,421 | A | * 11/1980 | Tucker | 16/2.2 |
| 4,261,386 | A | * 4/1981 | Young | 137/467 |
| 4,280,419 | A | * 7/1981 | Fischer | 111/174 |
| 4,948,179 | A | * 8/1990 | Kulikowski et al. | 285/316 |
| 5,161,473 | A | 11/1992 | Landphair et al. | 111/176 |
| 5,379,706 | A | * 1/1995 | Gage et al. | 111/175 |
| 5,392,722 | A | 2/1995 | Snipes et al. | 111/174 |
| 5,515,795 | A | 5/1996 | Ledermann et al. | 111/174 |
| 5,593,188 | A | * 1/1997 | McNaughton et al. | 285/319 |
| 5,655,468 | A | 8/1997 | Ledermann et al. | 111/164 |
| 5,664,626 | A | * 9/1997 | Watts, III | 166/75.13 |
| 6,047,652 | A | 4/2000 | Prairie et al. | 111/174 |
| 6,148,748 | A | * 11/2000 | Bardi et al. | 111/174 |
| 6,230,636 | B1 | * 5/2001 | Bom et al. | 111/13 |
| 6,253,693 | B1 | * 7/2001 | Mayerle et al. | 111/174 |
| 6,308,646 | B1 | 10/2001 | Luxon | 111/175 |
| 6,406,068 | B1 | * 6/2002 | Bartholoma et al. | 285/210 |
| 6,409,220 | B1 | * 6/2002 | Wing et al. | 285/12 |
| 6,511,099 | B2 | * 1/2003 | Bartholoma et al. | 285/140.1 |

FOREIGN PATENT DOCUMENTS

| | | |
|---|---|---|
| EP | 0 160 370 A1 | 11/1985 |
| EP | 0 620 963 A1 | 10/1994 |
| FR | 2 751 833 A1 | 2/1998 |

* cited by examiner

*Primary Examiner*—Victor Batson

(57) ABSTRACT

A pneumatic coupler for an agricultural seeding machine comprises a hollow tube having an inner portion and an outer portion that are separated by a radially extending flange. The radially extending flange has an inner surface adjoining the inner portion and an outer surface adjoining the outer surface. A flexible and resilient gasket is fitted over the inner portion and adjoins the inner surface of the radially extending flange. The inner portion is further provided with radially extending catches that are located on resilient axially extending tongues formed in the inner portion. When mounted to receiving apertures the catches contact the interior side of the receiving aperture and the flexible and resilient gasket forms an air seal between the exterior surface of the receiving aperture and the inner surface of the radially extending flange.

20 Claims, 2 Drawing Sheets

US 6,725,788 B2

PNEUMATIC COUPLER FOR AN AGRICULTURAL SEEDING MACHINE

FIELD OF THE INVENTION

The present invention is directed to a simple pneumatic coupler for use on agricultural seeding machines.

BACKGROUND OF THE INVENTION

Agricultural seeding machines use air pressure to meter and transport seed and agricultural chemicals. Pneumatic seed meters on row crop planters fall into two basic systems. In one system positive air pressure, that is air pressure which is greater than ambient air pressure, is used to meter the seeds. In the other system negative air pressure, that is air pressure that is less than ambient air pressure, is used to meter the seeds. An air pump is used to create the positive or negative air pressure. The air pump may be pneumatically coupled to an air pressure manifold. The air pressure manifold in turn is pneumatically coupled to the individual seed meters by an air hose. It is known to seal the main transverse support beam or toolbar to form the air pressure manifold. On one agricultural seeding machine currently on the market, the pneumatic fittings are metal and are welded to the toolbar.

SUMMARY OF THE INVENTION

It is an object of the present invention to provide a pneumatic coupler for an agricultural seeding machine that can be readily assembled and installed on a seeding machine.

The pneumatic coupler of the present invention comprises a hollow cylindrical tube having an inner portion and an outer portion that are divided from one another by a radially extending flange. The radially extending flange has an inner surface and an outer surface. The inner surface adjoining the inner portion of the hollow tube and the outer surface adjoining the outer portion of the hollow tube. A donut-shaped compressible and resilient gasket adjoins the inner surface of the radially extending flange. The inner portion of the tube is provided with radially extending catches that extend from axially extending resilient tongues formed in the inner portion. The hollow tube and radially extending flange are an integral nylon part.

The pneumatic coupler is mounted to an air pressure manifold on an agricultural seeding machine. The air pressure manifold has a hollow interior defined by an interior surface and an exterior defined by an exterior surface. Apertures are formed in the manifold to receive the pneumatic couplers. The inner portion of the hollow tube is inserted into a respective aperture so that the radially extending catches engage the adjoining interior surface of the manifold. The gasket is compressed between the inner surface of the radially extending flange and the exterior surface of the manifold. The gasket forming an air seal between the gasket and the exterior surface of the manifold and the gasket and the inner surface of the radially extending flange.

An air pump is pneumatically coupled to the air pressure manifold for maintaining a selected air pressure condition in the manifold. Individual air hoses extend from the outer portion of the hollow tubes to the individual seed meters.

In the illustrated embodiment the air pressure manifold is formed by sealing off the ends of the main transverse support beam or toolbar.

DETAILED DESCRIPTION

Figure 1:
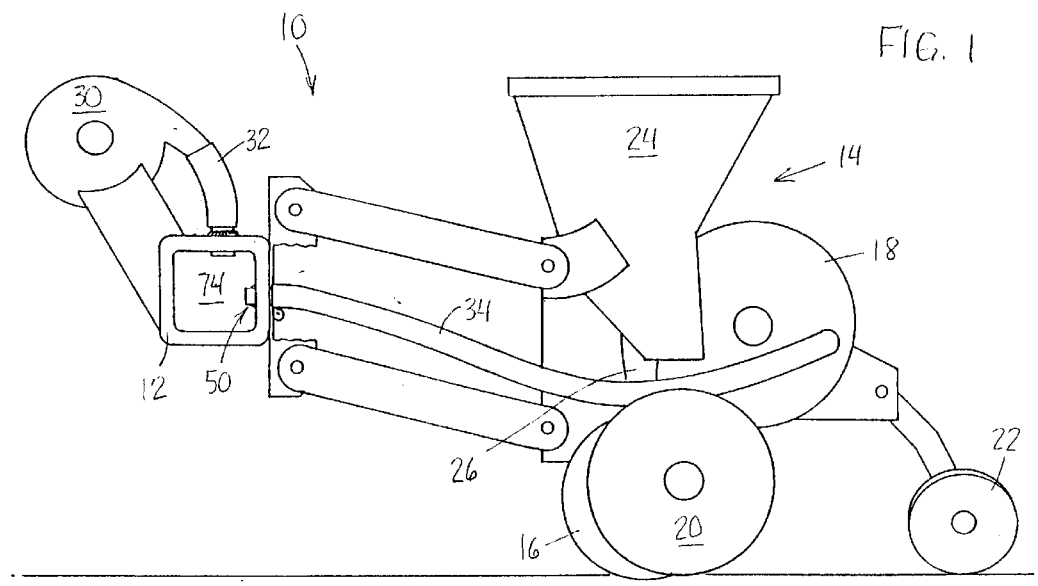
FIG. 1 is a side view of a seeding machine employing the pneumatic coupler of the present invention.
Figure 3:
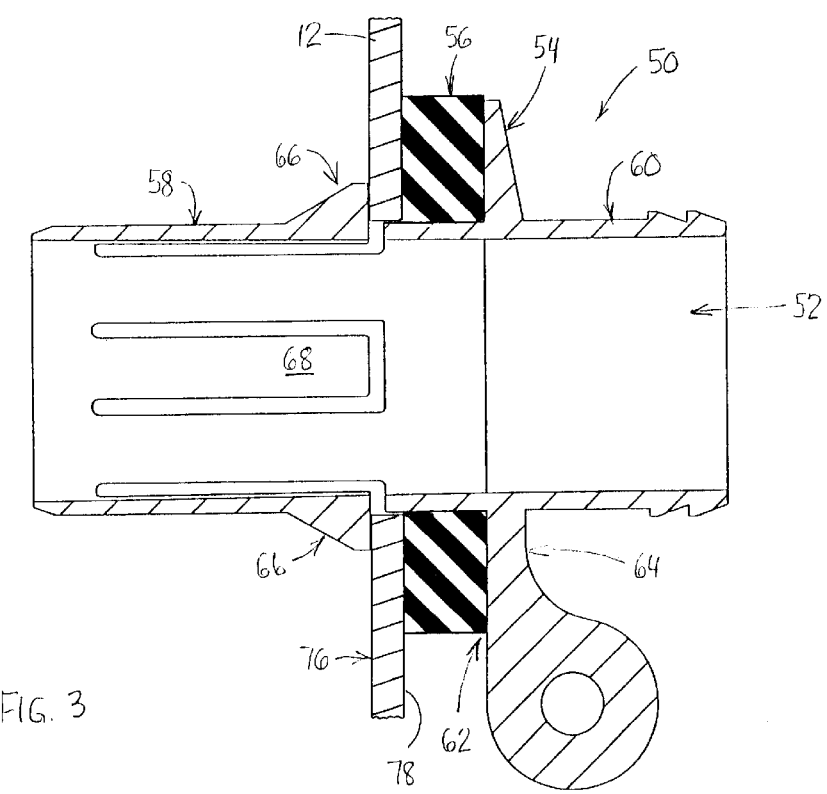
FIG. 3 is a cross sectional view of the pneumatic coupler.
Figure 2:
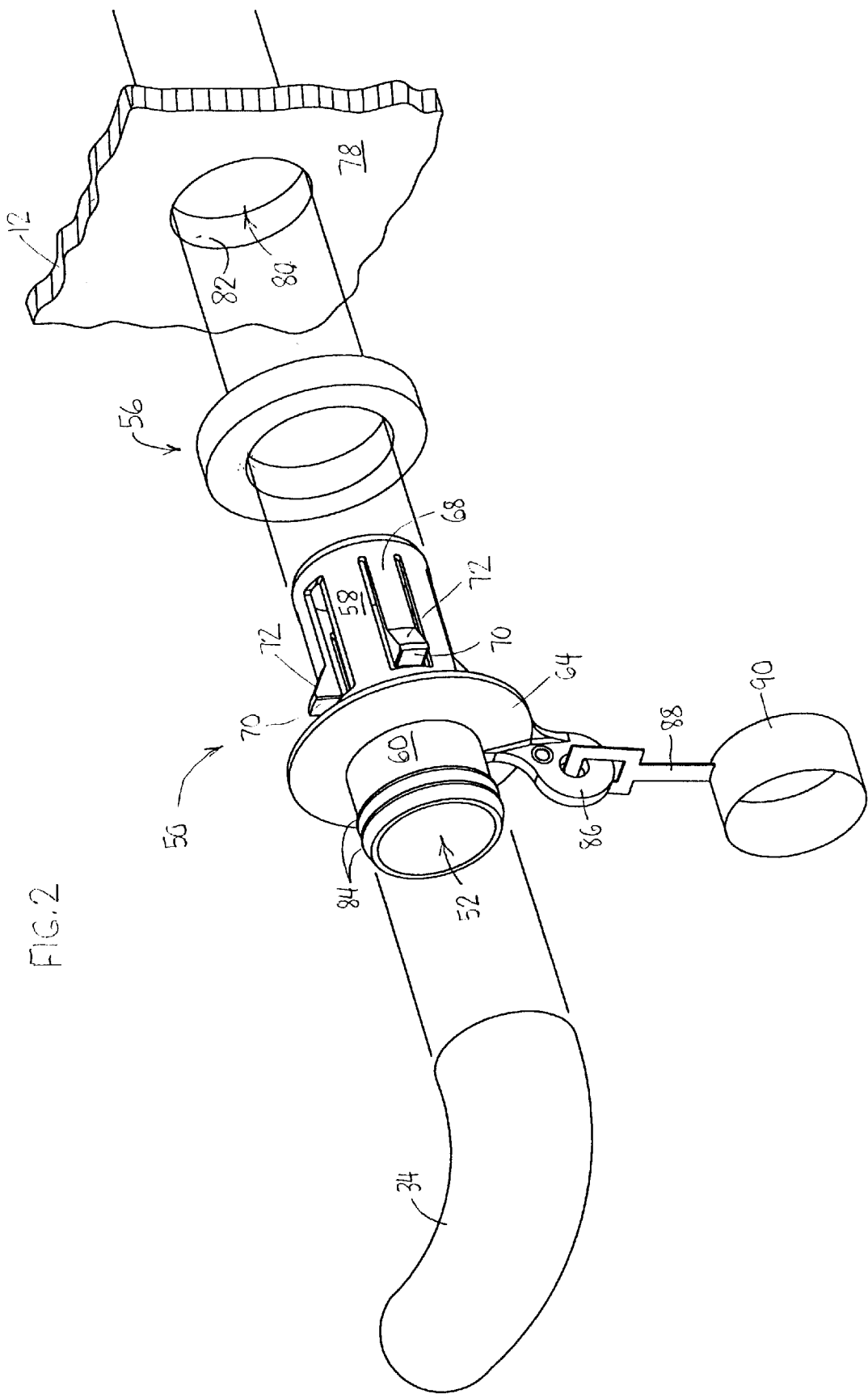
FIG. 2 is an exploded perspective view of the pneumatic coupler.

A seeding machine 10 comprises a main transverse support beam or toolbar 12, that is provided with a plurality of individual planting units 14. Each planting unit 14 comprises a furrow opener 16 for forming a seed planting furrow and a seed meter 18. Gauge wheels 20 associated with the planting unit 14 control the depth of the planting furrow formed by the furrow opener 16. Closing wheels 22 close the planting furrow after the seed has been deposited into the planting furrow. Seed to be planted is placed in the seed hopper 24 which directs the seed to the seed meter 18. The hopper 24 could be a full size hopper or a mini-hopper which is supplied seed from a central hopper by a seed on demand delivery system. The metered seed is directed into a seed tube 26 which directs the seed into the planting furrow. The Illustrated seed meter is a vacuum seed meter, wherein negative air pressure is used to meter seed. Although the illustrated embodiment is a vacuum seed meter, the present invention could be used with positive pressure pneumatic metering systems, as well.

An air pump 30 is pneumatically coupled to the main transverse support beam 12 by air line 32. The main transverse support beam 12 being sealed and forming an air pressure manifold. Although in the illustrated embodiment the main transverse support beam forms the air pressure manifold, other sealed hollow bodies could also be used as the air pressure manifold. The air pressure manifold is pneumatically coupled to the seed meter 18 by air hose 34. The air hose 34 is pneumatically coupled to the main transverse support beam 12 by a pneumatic coupler 50.

The pneumatic coupler 50 comprises two parts, a hollow cylindrical tube 52 having a radially extending circular flange 54 and a resilient compressible gasket 56. The hollow tube 52 comprises an inner portion 58 and an outer portion 60 that are divided by the radially extending flange 54. The hollow tube 52 and the radially extending flange 54 are preferably a single integral nylon part. The radially extending flange 54 is provided with an inner surface 62 adjoining the inner portion 58 of the hollow tube 52 and an outer surface 64 adjoining the outer portion 60 of the hollow tube 52. The resilient compressible gasket 56 is donut-shaped and fits over the inner portion 58 of the hollow tube 52 so that it adjoins the inner surface 62 of the radially extending flange 54. The inner portion 58 is also provided with radially extending catches 66 that extend radially outward from resilient tongues 68. The axially extending resilient tongues 68 are formed in the inner portion 58. The radially extending catches 66 have an engagement surface 70 and an angled biasing insertion surface 72.

The air pressure manifold formed by the main transverse support beam 12 has a hollow interior 74 that is defined by the interior surface 76 of the beam 12. The beam 12 is also provided with an exterior surface 78. Circular apertures 80 are formed in the beam 12 for attaching the pneumatic coupler 50. The pneumatic coupler 50 is attached by inserting the inner portion 58 into the respective aperture 80. The biasing insertion surface 72 engages the sidewall 82 of the aperture 80 and biases the catches 66 radially inward until the catches 66 have cleared the aperture sidewall 82. The resilient tongues 68 snap the catches radially outward after they have cleared the aperture sidewall 82 so that the engagement surfaces 70 come into contact with the interior surface 76 of the beam 12. The distance between the engagement surfaces 70 and the inner surface 62 of the radially extending flange 54 is designed to accommodate the wall of the beam 12 and the resilient compressible gasket 56 in a compressed condition. In its completely attached position the gasket 56 is compressed between the inner surface of the radially extending flange 54 and the exterior surface of the beam 12 forming an air seal between these two surfaces. Air hose 34 is fitted over the outer portion 60 of the hollow tube and can be held in place by friction or by a hose clamp if additional clamping force is necessary. The outer portion 60 is provided with two annular rims 84 which assist in gripping the air hose 34.

The outer surface of the radially extending flange 54 is provided with a ring 86 to which is attached a tether 88 having an integral cap 90. The cap 90 is used to cover the pneumatic coupler 50 and protect it from the elements when the air hose 34 is not attached.

Having described the preferred embodiment, it will become apparent that various modifications can be made without departing from the scope of the invention as defined in the accompanying claims.

What is claimed is:

1. A seeding machine comprising:
   a main transverse support beam;
   a plurality of planting units mounted to the main transverse support beam, the planting units each comprising a seed meter for metering seed and a furrow opener for forming a planting furrow, the seed meter using air pressure for metering seed;
   an air pump is pneumatically coupled to an air pressure manifold, the air pressure manifold having a hollow interior with an interior surface and an exterior surface, each of the seed meters of the planting units are pneumatically coupled to the air pressure manifold by air hoses that are attached to individual pneumatic couplers on the air pressure manifold, each individual pneumatic coupler comprises a hollow tube having an inner portion and an outer portion, a radially extending flange separates the inner portion from the outer portion, the radially extending flange having an inner surface that adjoins the inner portion and an outer surface that adjoins the outer portion, the inner portions of the pneumatic couplers extend through apertures in the air pressure manifold, the outer portions of the pneumatic couplers extend outwardly from the air pressure manifold and are coupled to the air hoses for the seed meters, resilient and compressible gaskets are located between the inner surface of the radially extending flanges and the exterior surface of the air pressure manifold, the inner portions of the pneumatic couplers are provided with outwardly extending catches that engage the interior surface of the air pressure manifold locking the pneumatic coupler to the air pressure manifold.

2. A seeding machine as defined by claim 1 wherein an air seal is formed between the resilient and compressible gasket and the exterior surface and the resilient and compressible gasket and the radially extending flange.

3. A seeding machine as defined by claim 2 wherein the inner portions of the pneumatic couplers are provided with resilient axially extending tongues on which the outwardly extending catches are located.

4. A seeding machine as defined by claim 3 wherein the catches have an engagement surface for engaging the interior surface of the main transverse support beam and an angled biasing insertion surface for biasing the catches inwardly as the pneumatic couplers are being inserted into the apertures.

5. A seeding machine as defined by claim 4 wherein the hollow tube and the radially extending flange are an integral nylon part.

6. A seeding machine as defined by claim 5 wherein the hollow tubes are cylindrical and the apertures and the radially extending flange are circular.

7. A seeding machine as defined by claim 6 wherein the resilient and compressible gasket is donut-shaped.

8. A seeding machine as defined by claim 7 wherein the air pump withdraws air from the air pressure manifold creating negative air pressure in the air pressure manifold.

9. A seeding machine as defined by claim 8 wherein the air pressure manifold is formed by the main transverse support beam.

10. A seeding machine as defined by claim 9 wherein the outer surfaces of the radially extending flanges are provided with rings to which are tethered caps for sealing the outer portion of the hollow tubes.

11. A seeding machine as defined by claim 10 wherein the outer portions are provided with annular rims.

12. An agricultural machine comprising:
    a frame;
    a meter for metering granular products is attached to the frame;
    an air pump is pneumatically coupled to the meter by a pneumatic coupler, the pneumatic coupler comprising a hollow tube having an inner portion and an outer portion, a radially extending flange separates the inner portion from the outer portion, the radially extending flange having an inner surface that adjoins the inner portion and an outer surface that adjoins the outer portion, the inner portion of the pneumatic coupler extends through a receiving aperture, the receiving aperture being defined by an interior surface and an exterior surface, the outer portion of the pneumatic coupler extends outwardly from the receiving aperture, a resilient and compressible gasket is located between the inner surface of the radially extending flanges and the exterior surface of the receiving aperture, the inner portion of the pneumatic coupler is provided with outwardly extending catches that engage the interior surface of the receiving aperture locking the pneumatic coupler to the receiving aperture.

13. An agricultural machine as defined by claim 12 wherein an air seal is formed between the resilient and compressible gasket and the exterior surface and the resilient and compressible gasket and the inner surface of the radially extending flange.

14. An agricultural machine as defined by claim 13 wherein the inner portions of the pneumatic coupler is provided with resilient axially extending tongues on which the radially extending catches are located.

15. An agricultural machine as defined by claim 14 wherein the catches have an engagement surface for engaging the interior surface of the receiving aperture and an angled biasing insertion surface for biasing the catches inwardly as the pneumatic coupler is being inserted into the receiving aperture.

16. An agricultural machine as defined by claim 15 wherein the hollow tube and the radially extending flange are an integral nylon part.

17. An agricultural machine as defined by claim 16 wherein the hollow tube is cylindrical and the receiving aperture and the radially extending flange are circular.

18. An agricultural machine as defined by claim 17 wherein the resilient and compressible gasket is donut-shaped.

19. An agricultural machine as defined by claim 18 wherein the outer surface of the radially extending flange is provided with a ring to which is tethered a cap for sealing the outer portion of the hollow tube.

20. An agricultural machine as defined by claim 19 wherein the outer portion is provided with an annular rim.

* * * * *